United States Patent
Malinsky

(10) Patent No.: US 8,959,025 B2
(45) Date of Patent: Feb. 17, 2015

(54) SYSTEM AND METHOD FOR AUTOMATIC IDENTIFICATION OF SPEECH CODING SCHEME

(75) Inventor: Genady Malinsky, Galil Maaravi (IL)

(73) Assignee: Verint Systems Ltd. (IL)

(*) Notice: Subject to any disclaimer, the term of this patent is extended or adjusted under 35 U.S.C. 154(b) by 959 days.

(21) Appl. No.: 13/096,148

(22) Filed: Apr. 28, 2011

(65) Prior Publication Data

US 2011/0295601 A1    Dec. 1, 2011

(30) Foreign Application Priority Data

Apr. 28, 2010   (IL) .......................................... 205394

(51) Int. Cl.
| | | |
|---|---|---|
| G10L 15/00 | (2013.01) | |
| H04L 29/06 | (2006.01) | |
| G10L 19/16 | (2013.01) | |
| G10L 21/00 | (2013.01) | |
| G10L 13/00 | (2006.01) | |
| H04B 3/36 | (2006.01) | |
| H04M 1/00 | (2006.01) | |
| H04L 9/32 | (2006.01) | |
| H04L 1/18 | (2006.01) | |
| G06K 9/36 | (2006.01) | |

(52) U.S. Cl.
CPC ............ *H04L 65/605* (2013.01); *G10L 19/167* (2013.01); *H04L 65/608* (2013.01); *H04L 69/22* (2013.01)
USPC .......... 704/500; 704/210; 704/201; 704/262; 704/231; 704/214; 455/7; 455/552.1; 713/168; 714/751; 382/239

(58) Field of Classification Search
USPC ......... 704/262, 500, 214, 231, 210, 201, 213, 704/226; 340/10.2; 713/168; 455/7, 552.1; 714/751; 382/239
See application file for complete search history.

(56) References Cited

U.S. PATENT DOCUMENTS

| | | | |
|---|---|---|---|
| 5,689,442 | A | 11/1997 | Swanson et al. |
| 6,240,386 | B1 | 5/2001 | Thyssen et al. |

(Continued)

FOREIGN PATENT DOCUMENTS

EP    1180764    2/2002

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Paras D Shah
*Assistant Examiner* — Neeraj Sharma
(74) *Attorney, Agent, or Firm* — Meunier Carlin & Curfman

(57) ABSTRACT

Methods and systems for extracting speech from such packet streams. The methods and systems analyze the encoded speech in a given packet stream, and automatically identify the actual speech coding scheme that was used to produce it. These techniques may be used, for example, in interception systems where the identity of the actual speech coding scheme is sometimes unavailable or inaccessible. For instance, the identity of the actual speech coding scheme may be sent in a separate signaling stream that is not intercepted. As another example, the identity of the actual speech coding scheme may be sent in the same packet stream as the encoded speech, but in encrypted form.

20 Claims, 2 Drawing Sheets

(56) References Cited

U.S. PATENT DOCUMENTS

| | | | |
|---|---|---|---|
| 6,404,857 B1 | 6/2002 | Blair et al. | |
| 6,718,023 B1 | 4/2004 | Zolotov | |
| 6,757,361 B2 | 6/2004 | Blair et al. | |
| 6,757,436 B2* | 6/2004 | Peters | 382/239 |
| 6,769,086 B2* | 7/2004 | Western et al. | 714/751 |
| 7,216,162 B2 | 5/2007 | Amit et al. | |
| 7,466,816 B2 | 12/2008 | Blair | |
| RE40,634 E | 2/2009 | Blair et al. | |
| 7,587,041 B2 | 9/2009 | Blair | |
| 7,739,120 B2* | 6/2010 | Makinen | 704/501 |
| 8,055,188 B2* | 11/2011 | Taori et al. | 455/7 |
| 8,374,852 B2* | 2/2013 | Murashima | 704/210 |
| 8,392,179 B2* | 3/2013 | Yu et al. | 704/214 |
| 8,527,282 B2* | 9/2013 | Oh et al. | 704/500 |
| 2006/0271359 A1* | 11/2006 | Khalil et al. | 704/226 |
| 2006/0281485 A1* | 12/2006 | Johnson et al. | 455/552.1 |
| 2007/0192086 A1* | 8/2007 | Guo et al. | 704/200.1 |
| 2008/0014873 A1 | 1/2008 | Krayer et al. | |
| 2008/0140392 A1* | 6/2008 | Kim | 704/201 |
| 2008/0147414 A1* | 6/2008 | Son et al. | 704/500 |
| 2008/0261192 A1 | 10/2008 | Huang et al. | |
| 2008/0285464 A1 | 11/2008 | Katzir | |
| 2010/0191534 A1* | 7/2010 | Ryu et al. | 704/262 |
| 2010/0198590 A1* | 8/2010 | Tackin et al. | 704/214 |
| 2010/0204997 A1* | 8/2010 | Zavarehei et al. | 704/500 |
| 2010/0332224 A1* | 12/2010 | Makela et al. | 704/231 |
| 2011/0115611 A1* | 5/2011 | Tsirline et al. | 340/10.2 |
| 2011/0238985 A1* | 9/2011 | Sovio et al. | 713/168 |

OTHER PUBLICATIONS

Rohde & Schwarz GmbH & Co. KG, "Accessnet-T, DMX-500 R2, Digital Mobile eXchange," Product Brochure, Secure Communications, Mar. 2000, 4 pages.

Rohde & Schwarz GmbH & Co. KG, "Accessnet-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S Ramon COMINT/CESM Software," Product Brochure, Radiomonitoring & Radiolocation, Jan. 2000, 22 pages.

Rohde & Schwarz GmbH & Co. Kg, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

* cited by examiner

SYSTEM AND METHOD FOR AUTOMATIC IDENTIFICATION OF SPEECH CODING SCHEME

FIELD OF THE DISCLOSURE

The present disclosure relates generally to speech processing, and particularly to methods and systems for automatic identification of speech coding schemes.

BACKGROUND OF THE DISCLOSURE

Various systems and applications transport encoded speech over communication networks. Speech coding is used, for example, in Voice over Internet Protocol (VoIP) systems. Speech coding is specified in a number of communication protocols, such as in the Real-time Transport Protocol (RTP). RTP is described, for example, by Schulzrinne et al., in "RTP: A Transport Protocol for Real-Time Applications," Request For Comments (RFC) 3550 of the Internet Engineering Task Force (IETF), July, 2003, which is incorporated herein by reference.

SUMMARY OF THE DISCLOSURE

An embodiment that is described herein provides a method for speech decoding, including:

accepting communication packets that carry encoded speech, which was encoded in accordance with a speech coding scheme whose identity is not accessibly identified in the communication packets;

using a processor, processing the encoded speech so as to automatically identify the speech coding scheme that was used to encode the speech; and decoding the encoded speech using the identified speech coding scheme.

In some embodiments, processing the encoded speech includes evaluating a characteristic of the encoded speech, and comparing the characteristic to respective characteristics of one or more possible speech coding schemes. In an embodiment, processing the encoded speech includes measuring a bit rate of the encoded speech, and comparing the measured bit rate to respective bit rates of one or more possible speech coding schemes. In another embodiment, processing the encoded speech includes measuring a frame rate of the encoded speech, and comparing the measured frame rate to respective frame rates of one or more possible speech coding schemes. In a disclosed embodiment, processing the encoded speech includes comparing at least one frame size found in the encoded speech to respective characteristic frame sizes of one or more possible speech coding schemes. In yet another embodiment, the encoded speech occupies a given payload size in each of the communication packets, and processing the encoded speech includes identifying a possible coding scheme having a frame size that is a divisor of the payload size.

In some embodiments, processing the encoded speech includes decoding the encoded speech in accordance with the two or more possible speech coding schemes, so as to produce two or more respective output streams, and deducing the identity of the speech coding scheme responsively to the output streams. In a disclosed embodiment, accepting the communication packets includes accepting with each packet a respective time stamp indicating a reception time of the packet, and deducing the identity of the speech coding scheme includes reconstructing occurrence times of speech activity in the output streams, and matching the occurrence times with the time stamps.

In another embodiment, deducing the identity of the speech coding scheme includes estimating a respective spectral range of at least one of the output streams, and determining the identity of the speech coding scheme based on the estimated spectral range. In yet another embodiment, deducing the identity of the speech coding scheme includes identifying silence periods in at least one of the output streams, and determining the identity of the speech coding scheme based on the identified silence periods. In still another embodiment, decoding the encoded speech includes decoding first and second decoded speech corresponding to respective, opposite directions of a communication session, so as to produce first and second output streams, and deducing the identity of the speech coding scheme includes matching silence periods in the first output stream with speech activity periods in the second output stream.

In some embodiments, the method includes reporting the identified speech coding scheme to an operator. In an embodiment, processing the encoded speech includes identifying two or more candidate speech coding schemes that are suspected of being used to encode the speech, and the method includes reporting the candidate speech coding schemes to an operator. In a disclosed embodiment, identifying the candidate speech coding schemes includes assigning the candidate speech coding schemes respective likelihoods of being used to encode the speech, and reporting the candidate speech coding schemes includes presenting the likelihoods to the operator. In an embodiment, the method includes accepting from the operator feedback that indicates which of the candidate speech coding schemes was actually used to encode the speech, and adapting processing of subsequent encoded speech responsively to the feedback.

There is additionally provided, in accordance with an embodiment that is described herein, apparatus for speech decoding, including:

an interface, which is configured to accept communication packets that carry encoded speech, which was encoded in accordance with a speech coding scheme whose identity is not accessibly identified in the communication packets; and a processor, which is configured to process the encoded speech so as to automatically identify the speech coding scheme that was used to encode the speech, and to decode the encoded speech using the identified speech coding scheme.

There is also provided, in accordance with an embodiment that is described herein, a computer software product for speech decoding, the product including a computer-readable medium, in which program instructions are stored, which instructions, when read by a computer, cause the computer to accept communication packets that carry encoded speech, which was encoded in accordance with a speech coding scheme whose identity is not accessibly identified in the communication packets, to process the encoded speech so as to automatically identify the speech coding scheme that was used to encode the speech, and to decode the encoded speech using the identified speech coding scheme.

The present disclosure will be more fully understood from the following detailed description of the embodiments thereof, taken together with the drawings in which:

DETAILED DESCRIPTION OF EMBODIMENTS

Overview

In various communication applications, users of a communication network communicate by exchanging data packets that carry encoded (compressed) speech. Typically, the speech in a given packet stream is encoded with a coding scheme that is selected from a set of possible coding schemes, so as to provide multiple trade-offs between bandwidth and voice quality.

Embodiments that are described herein provide improved methods and systems for extracting the speech from such packet streams. In particular, these methods and systems analyze the encoded speech in a given packet stream, and automatically identify the actual speech coding scheme that was used to produce it. These techniques are useful, for example, in interception systems where the identity of the actual speech coding scheme is sometimes unavailable or inaccessible. For instance, the identity of the actual speech coding scheme may be sent in a separate signaling stream that is not intercepted. As another example, the identity of the actual speech coding scheme may be sent in the same packet stream as the encoded speech, but in encrypted form.

Several example methods for deducing the identity of the actual speech coding scheme are described herein. In some embodiments, a characteristic of the encoded speech is estimated and compared to corresponding characteristics of possible coding schemes, without necessarily attempting to decode the encoded speech. In alternative embodiments, the encoded speech is decoded in accordance with multiple possible coding schemes, and the actual speech coding scheme is deduced from the multiple decoded streams.

The deduced identity of the actual speech coding scheme is typically reported to an operator. In some embodiments, if a single actual coding scheme cannot be identified, the range of possibilities is narrowed to a small number of probable schemes that are reported to the operator. The operator can then request to decode the encoded speech using any of the deduced coding schemes, and play the resulting audio.

In many practical cases, the disclosed techniques reduce the range of possibilities from several tens of coding schemes to one or few likely candidates. Thus, the automatic processes described herein relieve the operator of the time-consuming task of manually testing different coding schemes in order to identify the scheme that was actually used to produce the encoded speech. As a result, the speed and quality of speech interception and reconstruction can be improved considerably.

System Description

Figure 1:
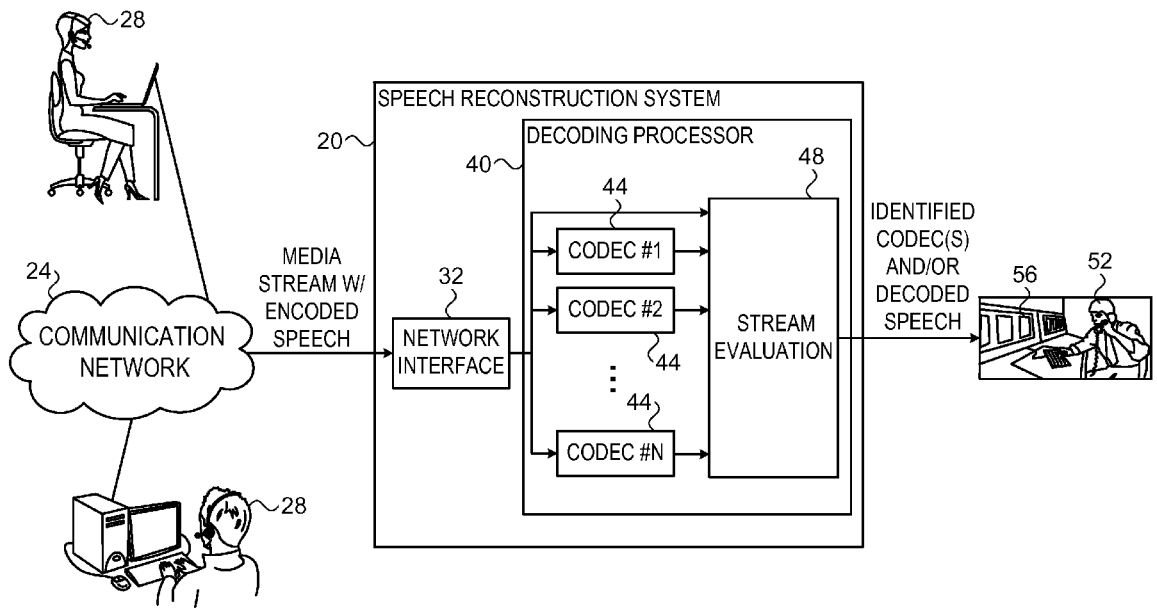
FIG. 1 is a block diagram that schematically illustrates a system for automatic identification of speech coding schemes, in accordance with an embodiment of the present disclosure.

FIG. 1 is a block diagram that schematically illustrates a system 20 for automatic identification of speech coding schemes, in accordance with an embodiment of the present disclosure. System 20 accepts communication packets that carry encoded speech from a communication network 24, and automatically identifies the speech coding schemes that were used for producing the encoded speech. System 20 may be operated, for example, by an intelligence or government agency for intercepting speech communication from network 24.

In network 24, network users 28 communicate with one another using voice communication. For example, network 20 may comprise an Internet Protocol (IP) network such as the Internet, and users 28 may communicate using a Voice over IP (VoIP) application. Alternatively, network 24 may comprise any other suitable network type, and users 28 may conduct speech communication with one another using any other suitable application. Applications that involve speech communication may comprise, for example, chat applications such as GoogleTalk, MSN messenger or ICQ. The disclosed techniques can also be used in any other suitable application that delivers encoded audio, such as broadcast applications that broadcast music, radio programming or other audio content.

Users 28 communicate by transmitting streams of communication packets to one another. Each stream of packets carries digitized speech from a source user to a destination user. In a given packet stream, the speech is encoded and then formatted in accordance with a certain communication protocol. In an example embodiment, users 28 transmit Real-time Transport Protocol (RTP) streams. Additionally or alternatively, the protocol may comprise the Session Initiation Protocol (SIP), H.323, or a proprietary protocols such as the protocols used in SKYPE, GoogleTalk and ICQ applications. As yet another example, the protocol may comprise the User Datagram Protocol (UDP), or UDP combined with a proprietary header. Further alternatively, any other suitable communication protocol can be used.

Speech coding, also referred to as speech compression, is applied in order to reduce the bandwidth consumed by the speech data. In some communication protocols, the communication protocol supports multiple possible speech coding schemes, which typically provide different trade-offs between bandwidth and voice quality. RTP, for example, supports speech coding schemes such as AMR, G.711, G.726, G.724, iLBC, SPEEX, AGsm, G723.1, G.722, G.729 and SILK, to mention just a few examples.

Typically, each user 28 supports multiple Coders-Decoders (CODECs) that encode and decode speech using the multiple coding schemes supported by the protocol in question. In the description that follows, the terms "CODEC" and "speech coding scheme" are used interchangeably. When producing a given packet stream, a certain speech coding scheme is selected from among the multiple possible schemes, and the speech is encoded using the selected scheme. The selected coding scheme is typically coordinated between the source user and the destination user, so that the destination user is able to apply the appropriate speech decoding to the encoded speech it receives. For example, the selected speech coding scheme may be reported from the source user to the destination user using a suitable signaling protocol (e.g., SIP or H.323).

System 20 accepts packet streams from network 24, each packet stream carrying speech that is encoded with a certain speech coding scheme. For each packet stream, the system attempts to decode the encoded speech and play the decoded speech to an operator 52. In some practical scenarios, however, the identity of the actual speech coding scheme that was used for producing the encoded speech is not accessibly identified in the packet stream.

The term "not accessibly identified" refers to various scenarios in which system 20 is unable to explicitly extract the identity of the actual speech coding scheme from the packet stream. In some cases, the identity of the actual speech coding scheme is not specified in the packet stream. In other cases, the identity of the actual speech coding scheme is specified in the packet stream, but in a form that is inaccessible to system 20.

For example, in some cases the identity of the actual speech coding scheme is not reported as part of the packet stream in question, but in a separate signaling stream. The signaling stream may not be accessible to system 20, e.g., because it traverses a different path in network 24 that is not monitored by system 20. In other cases, the signaling information, and in particular the identity of the actual speech coding scheme, is encrypted or obfuscated and cannot be accessed by system 20. As another example, the signaling protocol may be unknown or unsupported, as may occur, for example, with proprietary applications. Alternatively, the identity of the actual speech coding scheme may not be accessibly identified in the packet stream for any other reason.

In order to decode the encoded speech, system 20 automatically identifies the actual speech coding scheme, using methods that are described in detail below. These methods deduce the actual speech coding scheme by analyzing the speech media alone, i.e., based exclusively on the intercepted packet stream. System 20 comprises a network interface 32 that accepts the packet streams from communication network 24, and a decoding processor 40 that carries out the methods described herein.

Processor 40 comprises multiple speech decoders 44, also referred to as CODECs, and a stream evaluation unit 48. Each CODEC 44 decodes encoded speech in accordance with one of the possible speech coding scheme. In some embodiments, unit 48 accepts the outputs of CODECs 44, as well as the original encoded speech. When analyzing a given packet stream, unit 48 identifies the actual speech coding scheme based on these inputs. Several example techniques that can be used by unit 48 for identifying the actual speech coding scheme are described below.

In some embodiments, unit 48 compares certain characteristics of the encoded speech to corresponding characteristics of two or more of the possible coding schemes, typically without decoding the encoded speech. If the characteristics of the encoded speech match the characteristics of any of the possible coding schemes, unit 48 may report the matching coding schemes to the operator. Unit 48 may attempt to match a single characteristic or multiple characteristics. Several example characteristics that can be used for matching coding schemes are described further below.

In alternative embodiments, processor 40 attempts to decode the encoded speech carried by the packet stream using two or more of CODECs 44, i.e., using two or more different speech coding schemes. Each CODEC produces a respective output stream. Unit 48 then deduces the actual speech coding scheme based on the multiple output streams.

Having deduced the actual speech coding scheme, processor 40 reports the deduced scheme to operator 52, e.g., using an operator console 56 or using any other suitable output device. In some embodiments, processor 40 plays the decoded speech audio (i.e., the output stream produced by the CODEC that corresponds to the actual coding scheme) to operator 52. Additionally or alternatively, processor 40 may record the decoded speech on a suitable storage device (not shown in the figure).

In some embodiments, processor 40 may not identify a single actual speech coding scheme, but rather narrows down the possibilities to two or more candidate schemes that are likely to have been used. In these embodiments, processor 40 may report these probable schemes to operator 52. The operator may then request system 20 to decode the encoded speech using any of the probable coding schemes and play the resulting audio. In an embodiment, processor 40 assigns a respective likelihood or confidence level to each probable coding scheme, and presents these likelihoods to the operator. This feature enables the operator to try the most probable coding schemes first. In some embodiments, the operator may provide feedback to the system, indicating the quality (e.g., correctness or accuracy) of the automatic detection process. The feedback can later be used to improve the automatic detection process, e.g., using neural networks or other heuristic schemes, or any other suitable method.

The system configuration shown in FIG. 1 is an example configuration, which is chosen purely for the sake of conceptual clarity. In alternative embodiments, any other suitable system configuration can also be used. The elements of system 20 can be implemented using hardware, such as using one or more Application-Specific Integrated Circuits (ASICs) or Field-Programmable Gate Arrays (FPGAs). Additionally or alternatively, the elements of system 20 can be implemented using software, or using a combination of hardware and software elements. In particular, CODECs 44 can be implemented in hardware, in software or using a combination of hardware and software elements. Although in FIG. 1 CODECs 44 are shown as operating in parallel on the packet streams, the different CODECs can be applied to a given packet stream sequentially or in semi-parallel. In some embodiments, the functions of system 20 can be integrated with other functions, such as in an interception and/or speech analysis system.

In some embodiments, processor 40 comprises a general-purpose computer, which is programmed in software to carry out the functions described herein. The software may be downloaded to the computer in electronic form, over a network, for example, or it may, alternatively or additionally, be provided and/or stored on tangible non-transitory media, such as magnetic, optical, or electronic memory.

Automatic Identification of Speech Coding Scheme

Unit 48 in processor 40 may use various techniques for automatically deducing the actual speech coding scheme that was used to produce the encoded speech in a given packet stream. Some of these techniques involve attempting to decode the encoded speech, while other techniques evaluate the encoded speech without trying to decode it.

In some embodiments, unit 48 evaluates a characteristic of the encoded speech, and compares it to corresponding characteristics of two or more possible speech coding schemes. For example, some speech coding schemes differ from one another in the bit rate of the encoded speech. In some embodiments, unit 48 measures the actual bit rate of the encoded speech, and compares the measured bit rate with the bit rates of the possible coding schemes. If the measured bit rate matches the bit rate of any of the possible coding schemes, unit 48 may deduce that the encoded speech is likely to have been encoded using one of these coding schemes. Unit 48 may regard two bit rates as matching one another, for example, if the difference between them does not exceed a predefined value.

In some communication protocols, one or more data frames of encoded speech are inserted as a payload into each communication packet. Some speech coding schemes may differ from one another in the size of the data frames they produce. Unit 48 may assume that the size of the payload in each communication packet should be an integer multiple of the data frame size. Based on this assumption, unit 48 may measure the payload size of the packets that carry the encoded speech. Then, unit 48 may attempt to find coding schemes whose data frame size is a divisor of the payload size in the packets. If a match is found, unit 48 may deduce that the encoded speech is likely to have been encoded using one of the matching coding schemes.

In some embodiments, system 20 accepts the packet stream together with time stamps, which indicate the time at which each packet was intercepted. In an embodiment, processor 40 may decode the encoded speech using a given CODEC 44 (i.e., a given coding scheme) and reconstruct the real-time occurrence times of speech activity in the output stream. If the occurrence times of speech activity in the CODEC output match the time stamps of the packets, then unit 48 may deduce that the encoded speech is likely to have been encoded using this coding scheme.

In some embodiments, system 20 accepts two packet streams corresponding to opposite directions of the same communication session (i.e., one packet stream with the speech sent from user A to user B, and another packet stream with the speech sent from user B to user A during the same session). Typically, these two packet streams are encoded with the same coding scheme. Processor 40 may decode the encoded speech of the two packet streams using a given CODEC, and compare the speech activity periods and silence periods of the two streams. The assumption is that if the selected coding scheme is indeed the scheme that was used to encode the speech in the two packet streams, then activity periods in one stream will be aligned with silence periods in the other stream. If the selected coding scheme is wrong, no such correlation is likely to be found. Thus, if unit 48 finds a correlation between silence periods in one stream and activity periods in the other stream, it may deduce that the CODEC selection is correct, and vice versa.

As another example, unit 48 may assess the spectral response of the different output streams produced by CODECs 44. Typically, the decoding using the correct coding scheme would produce an output stream whose spectral content is concentrated in a specific range of audio frequencies. Decoding using a wrong coding scheme typically produces a wider spectral response that resembles white noise. Unit 48 may identify the correct coding scheme using these spectral characteristics. Further alternatively, unit 48 may use processes that are based on artificial intelligence, such as neural network methods.

As yet another example, unit 48 measures the frame rate of the encoded speech, e.g., the number of frames per second. This parameter may be indicative of the speech coding scheme that was used to encode the speech, or at least of several candidate schemes. In some cases, a given speech coding schemes has a set of characteristic frame sizes, e.g., silence frames and/or silence descriptor frames. In some embodiments, unit 48 may identify frames having the characteristic sizes, and thus deduce the identity of the speech coding scheme.

In alternative embodiments, unit 48 may apply any other suitable technique to the encoded speech, in order to deduce the actual coding scheme that was used in encoding the speech. Note that some of the techniques can be applied without actually decoding the encoded speech.

Figure 2:
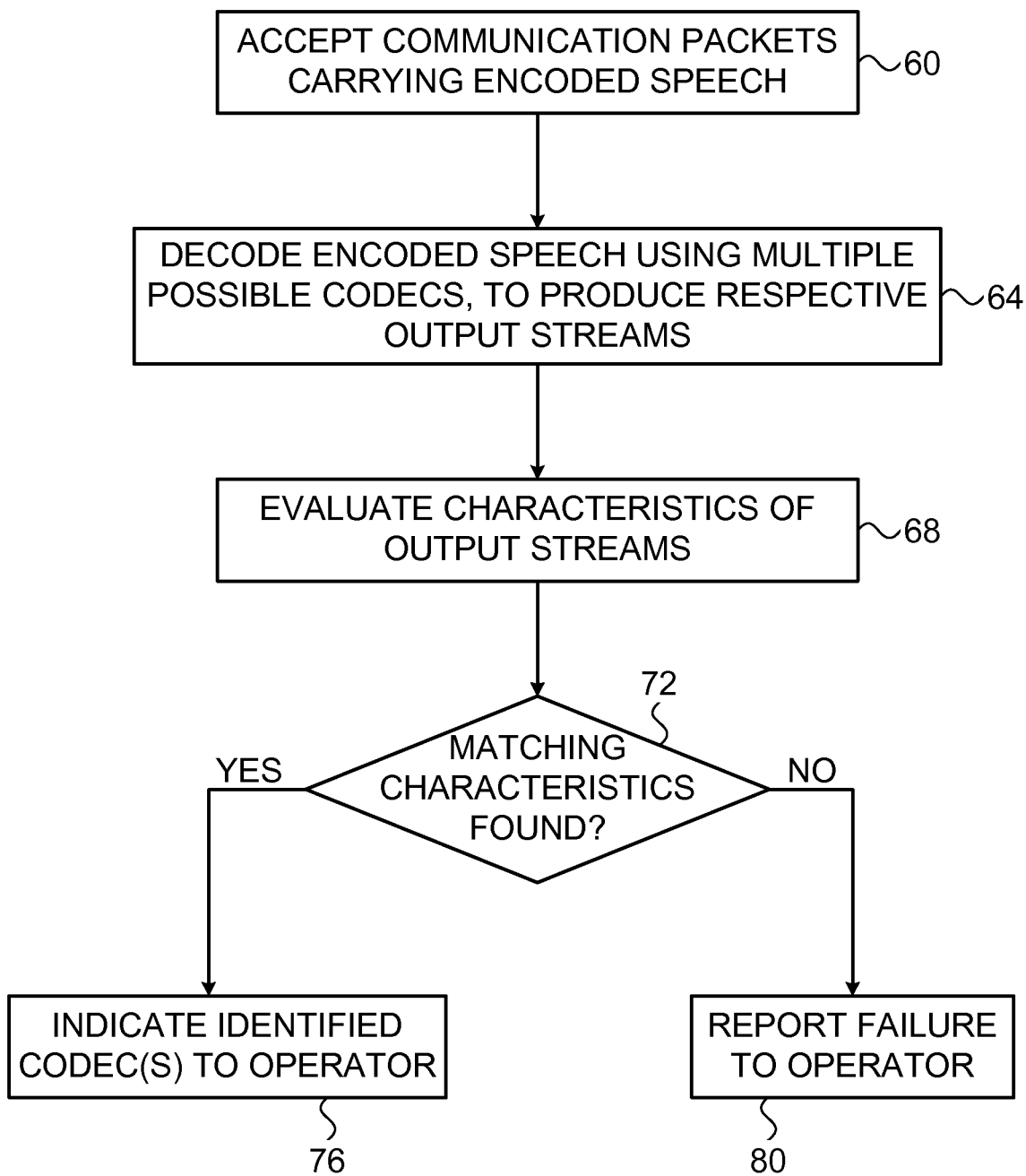
FIG. 2 is a flow chart that schematically illustrates a method for automatic identification of speech coding schemes, in accordance with an embodiment of the present disclosure.

FIG. 2 is a flow chart that schematically illustrates a method for automatic identification of speech coding schemes, in accordance with an embodiment of the present disclosure. The method of FIG. 2 identifies the actual coding scheme by decoding the encoded speech using multiple CODECs 44. As noted above, however, alternative methods evaluate the encoded speech directly irrespective of any decoding attempts.

The method begins with system 20 accepting communication packets carrying encoded speech, at an input step 60. Processor 40 decodes the encoded speech using two or more CODECs 44, so as to produce multiple respective output streams, at a decoding step 64. Unit 48 in processor 40 evaluates certain characteristics of the output streams, at a characteristic evaluation step 68. Unit 48 attempts to find at least one coding scheme that matches the evaluated characteristics, at a match checking step 72. If a match is found, processor 40 reports the matching coding schemes to operator 52, at a success reporting step 76. Otherwise, i.e., if no match is found, processor 40 reports failure to operator 52, at a failure reporting step 80.

As noted above, in some cases processor 40 reports more than one probable coding scheme to operator 52, and allows the operator to play the speech decoded using each probable scheme in order to select the correct one. In some embodiments, processor 40 accepts feedback from the operator as to which of the reported coding schemes was found to be the correct one. The processor may use this information to adapt or refine the identification criteria for subsequent packet streams.

Although the embodiments described herein refer mainly to interception applications, the disclosed techniques can also be used for automatically identifying speech coding schemes in other applications, such as in test equipment (e.g., network probes and Quality-of-Service measurement platforms) or in media players.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method for speech decoding, comprising:
   accepting communication packets that carry encoded speech, which was encoded in accordance with a speech coding scheme whose identity is not accessibly identified in the communication packets, wherein accepting the communication packets comprises accepting with each packet a respective time stamp indicating a reception time of the packet;
   using a processor, processing the encoded speech so as to automatically identify the speech coding scheme that was used to encode the speech;
   decoding the encoded speech using the identified speech coding scheme, wherein processing the encoded speech comprises decoding the encoded speech in accordance with the two or more possible speech coding schemes, so as to produce two or more respective output streams; and
   deducing the identity of the speech coding scheme responsively to the output streams, wherein deducing the identity of the speech coding scheme comprises reconstructing occurrence times of speech activity in the output streams and matching the reconstructed occurrence times with the respective time stamps.

2. The method according to claim 1, wherein processing the encoded speech further comprises evaluating a characteristic of the encoded speech, and comparing the characteristic to respective characteristics of one or more possible speech coding schemes.

3. The method according to claim 1, wherein processing the encoded speech further comprises measuring a bit rate of the encoded speech, and comparing the measured bit rate to respective bit rates of one or more possible speech coding schemes.

4. The method according to claim 1, wherein processing the encoded speech further comprises measuring a frame rate of the encoded speech, and comparing the measured frame rate to respective frame rates of one or more possible speech coding schemes.

5. The method according to claim 1, wherein processing the encoded speech further comprises comparing at least one frame size found in the encoded speech to respective characteristic frame sizes of one or more possible speech coding schemes.

6. The method according to claim 1, wherein the encoded speech occupies a given payload size in each of the communication packets, and wherein processing the encoded speech further comprises identifying a possible coding scheme having a frame size that is a divisor of the payload size.

7. The method according to claim 1, wherein deducing the identity of the speech coding scheme further comprises estimating a respective spectral range of at least one of the output streams, and determining the identity of the speech coding scheme based on the estimated spectral range.

8. The method according to claim 1, wherein deducing the identity of the speech coding scheme further comprises identifying silence periods in at least one of the output streams, and determining the identity of the speech coding scheme based on the identified silence periods.

9. The method according to claim 1, wherein decoding the encoded speech further comprises decoding first and second decoded speech corresponding to respective, opposite directions of a communication session, so as to produce first and second output streams, and wherein deducing the identity of the speech coding scheme further comprises matching silence periods in the first output stream with speech activity periods in the second output stream.

10. The method according to claim 1, and comprising reporting the identified speech coding scheme to an operator.

11. The method according to claim 1, wherein processing the encoded speech further comprises identifying two or more candidate speech coding schemes that are suspected of being used to encode the speech, and comprising reporting the candidate speech coding schemes to an operator.

12. The method according to claim 11, wherein identifying the candidate speech coding schemes comprises assigning the candidate speech coding schemes respective likelihoods of being used to encode the speech, and wherein reporting the candidate speech coding schemes comprises presenting the likelihoods to the operator.

13. The method according to claim 11, and comprising accepting from the operator feedback that indicates which of the candidate speech coding schemes was actually used to encode the speech, and adapting processing of subsequent encoded speech responsively to the feedback.

14. Apparatus for speech decoding, comprising:
an interface, which is configured to accept communication packets that carry encoded speech, which was encoded in accordance with a speech coding scheme whose identity is not accessibly identified in the communication packets, wherein accepting the communication packets comprises accepting with each packet a respective time stamp indicating a reception time of the packet; and
a processor, which is configured to process the encoded speech so as to automatically identify the speech coding scheme that was used to encode the speech, and to decode the encoded speech using the identified speech coding scheme, wherein processing the encoded speech comprises decoding the encoded speech in accordance with the two or more possible speech coding schemes, so as to produce two or more respective output streams, and deducing the identity of the speech coding scheme responsively to the output streams, wherein deducing the identity of the speech coding scheme comprises reconstructing occurrence times of speech activity in the output streams and matching the reconstructed occurrence times with the respective time stamps.

15. The apparatus according to claim 14, wherein the processor is further configured to identify the speech coding scheme by evaluating a characteristic of the encoded speech, and comparing the characteristic to respective characteristics of one or more possible speech coding schemes.

16. The apparatus according to claim 14, wherein the processor is further configured to identify the speech coding scheme by measuring a bit rate of the encoded speech, and comparing the measured bit rate to respective bit rates of one or more possible speech coding schemes.

17. The apparatus according to claim 14, wherein the processor is further configured to identify the speech coding scheme by measuring a frame rate of the encoded speech, and comparing the measured frame rate to respective frame rates of one or more possible speech coding schemes.

18. The apparatus according to claim 14, wherein the processor is further configured to identify the speech coding scheme by comparing at least one frame size found in the encoded speech to respective characteristic frame sizes of one or more possible speech coding schemes.

19. A method for speech decoding, comprising:
accepting communication packets that carry encoded speech, which was encoded in accordance with a speech coding scheme whose identity is not accessibly identified in the communication packets;
using a processor, processing the encoded speech so as to automatically identify the speech coding scheme that was used to encode the speech, wherein processing the encoded speech further comprises identifying two or more candidate speech coding schemes that are suspected of being used to encode the speech, wherein identifying the candidate speech coding schemes comprises assigning the candidate speech coding schemes respective likelihoods of being used to encode the speech;
decoding the encoded speech using the identified candidate speech coding scheme; and
reporting the candidate speech coding schemes to an operator, wherein reporting the candidate speech coding schemes comprises presenting the likelihoods to the operator.

20. The method according to claim 19, further comprising accepting from the operator feedback that indicates which of the candidate speech coding schemes was actually used to encode the speech, and adapting processing of subsequent encoded speech responsively to the feedback.

* * * * *